United States Patent [19]

Sjöstrand et al.

[11] 4,112,809

[45] Sep. 12, 1978

[54] STRINGED INSTRUMENT FOR PLAY TRAINING

[75] Inventors: Gunnar Sjöstrand; Staffan Sjöstrand, both of Åtvidaberg, Sweden

[73] Assignee: Musikindustriell Forskning MIFO AB, Atvidaberg, Sweden

[21] Appl. No.: 704,086

[22] Filed: Jul. 9, 1976

[30] Foreign Application Priority Data

Jul. 17, 1975 [SE] Sweden ................................ 7508174

[51] Int. Cl.[2] ........................ G10D 3/04; G09B 15/06; G09B 15/00

[52] U.S. Cl. ........................................ 84/465; 84/291; 84/311; 84/470 R; 181/131; 181/141

[58] Field of Search ................. 84/291, 275, 465, 470, 84/453, 310, 311, 450, 267, 11; 181/131, 141, 126, 129

[56] References Cited

U.S. PATENT DOCUMENTS

| | | | |
|---|---|---|---|
| 1,536,109 | 5/1925 | Lessard | 181/129 |
| 2,229,189 | 1/1941 | Rice | 84/465 |
| 3,001,431 | 9/1961 | Andersen | 84/470 |

*Primary Examiner*—Stephen J. Tomsky
*Attorney, Agent, or Firm*—George H. Mitchell, Jr.

[57] ABSTRACT

A stringed instrument for training purposes resembles the usual instrument but comprises a body of sound-damping material which replaces the resonance-box to reduce exterior sound, the sound of the strings being transmitted to the ears of the user by a listening device.

3 Claims, 2 Drawing Figures

STRINGED INSTRUMENT FOR PLAY TRAINING

The present invention refers to a stringed instrument for play training.

As to vigorous tradition the violin holds a unique position among the musical instruments. This is true not only for ideal resonance but also for form and size. However, the interest in violin studies has decreased due to among other things difficulties for the beginner to find suitable places for training. This is due to the fact that the violin has a very great acoustic penetration and therefore violin play is regarded as very disturbing in modern, inefficiently sound-proof flats. This is to be regretted when bearing in mind among other things the great importance of the violinists in orchestral connections. Therefore, there exists a great need to provide a training violin which can be used in places with very poor sound-insulation. Such a training violin should thereby be equal to a conventional instrument not only as to resonance but also as to form and size.

The object of the present invention is therefore to provide a stringed instrument for play training the sound of which does not force its way out to the neighborhood. The characteristics of the invention will appear from the attached claims.

Figure 2:
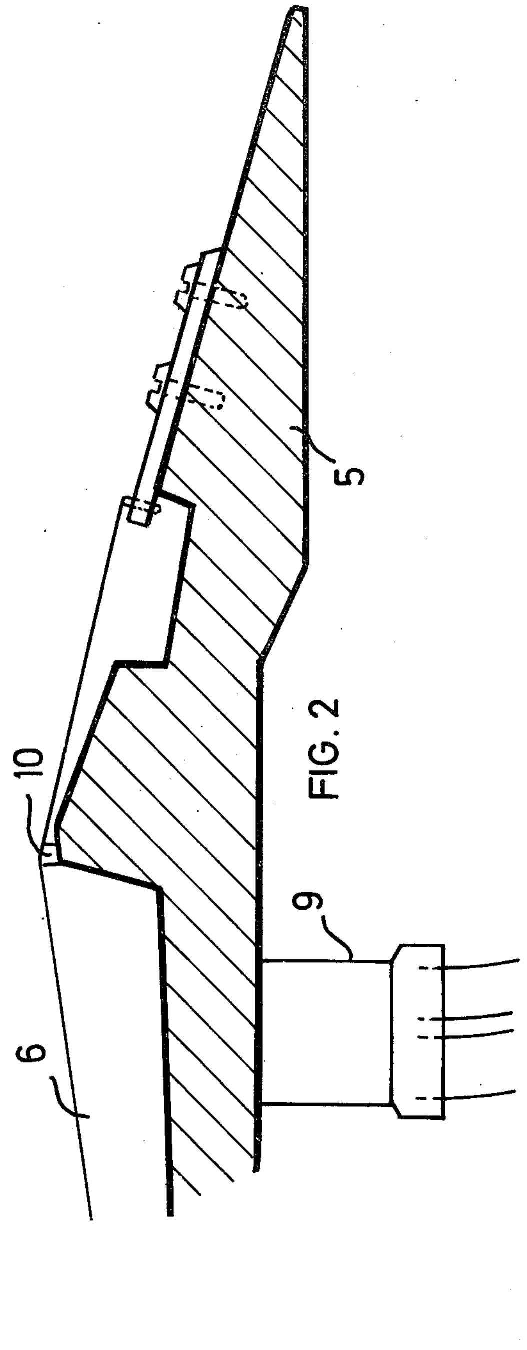
Figure 1:
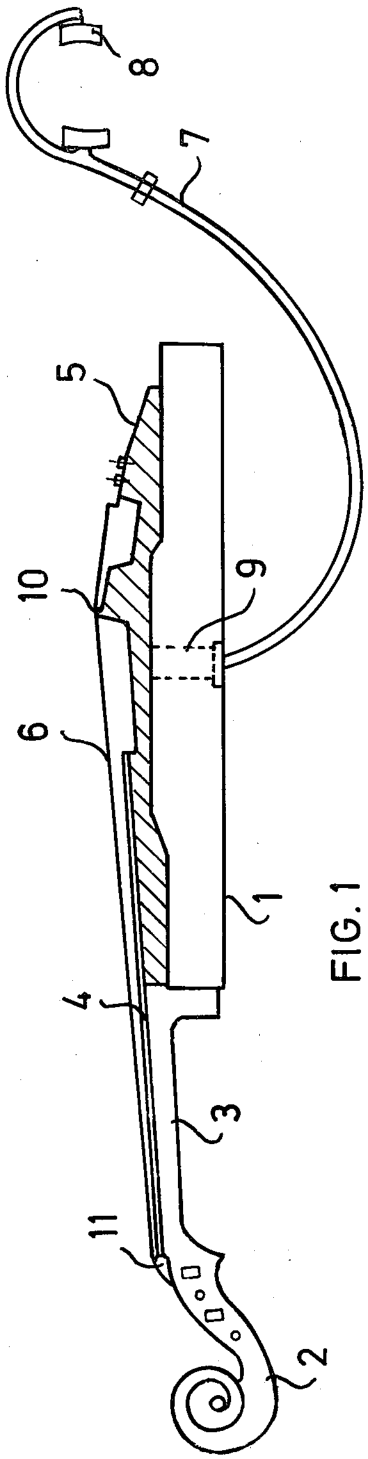

The invention will now be described in detail, reference being made to the attached drawing in which FIG. 1 shows a stringed instrument according to the invention seen from the side and FIG. 2 shows an enlargement of the central part of the instrument.

In FIG. 1, references 2, 3, and 4 denote the helix, the neck and the grip-board of the instrument, respectively, which are fixed to a plate 5 suitably made of wood to which the strings 6 are fixed. The resonance-box of the violin is replaced by a body of a sound-damping material 1, which could for example be made of foam plastic and have the traditional form of the resonance-box. To the plate 5 a sound pick up device 9 is attached for listening to catch the sound-waves which are supplied by the plate when the strings vibrate. In order to avoid too high of a sound intensity when playing with loose strings the bodies 10 and 11, respectively, made of a soft material, for example rubber, are placed under the strings at the bridge and the nut.

The sound waves are forwarded to the user's ear by means of a listening apparatus 7 which is fixed to the just mentioned device 9 and which consists of tubes — for example made of soft plastic — and ear-pieces, whereby the tubes are inserted into the ear-pieces preferably as close to the drum-membranes as possible. By this construction the sound-waves brought forth by the strings could be listened to directly independent of a complicated resonance-box. This construction is also favourable for the resonance balance, which can be varied in sound intensity by choosing the position of the listening apparatus in relation to the plate on which the strings are fixed. At the same time, only very low sounds gain the neighborhood and training can take place without discomfort for other people present.

The invention can also be used within another field of application of great importance for group teaching. The sound waves can be registered and fortified electronically, which admits that the instrument can be added to a musical laboratory for example only violin studies or for playing together with for example pianos, and for connection to a fortifying apparatus. Finally, it should be pointed out that the invention could of course also be used together with other instrument types as for example cello and gamba.

We claim:

1. Training instrument for practicing the playing of a stringed instrument comprising the neck and grip-board of a stringed instrument for a set of strings to be attached at one of their ends to said neck, a plate attached to said grip-board to support the other ends of said strings, a structure to simulate a resonance-box comprising a body of sound-damping material to minimize the exterior dispersion of sounds produced by the strings, and acoustic sound pickup means attached to said plate within said structure to transmit sounds from the strings to the user of the instrument.

2. Training instrument according to claim 1, wherein said pickup means is acoustic and includes a pair of tubes for acoustically transmitting said sounds to the ears of the user.

3. Training instrument according to claim 1, wherein said strings are supported on said instrument with sound-damping material.

* * * * *